US012416386B2

(12) United States Patent
Van Bommel et al.

(10) Patent No.: US 12,416,386 B2
(45) Date of Patent: Sep. 16, 2025

(54) HIGH BRIGHTNESS LIGHT SOURCE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/833,469

(22) PCT Filed: Jan. 23, 2023

(86) PCT No.: PCT/EP2023/051565
§ 371 (c)(1),
(2) Date: Jul. 26, 2024

(87) PCT Pub. No.: WO2023/144092
PCT Pub. Date: Aug. 3, 2023

(65) Prior Publication Data

US 2025/0180175 A1 Jun. 5, 2025

(30) Foreign Application Priority Data

Jan. 27, 2022 (EP) .................................... 22153708

(51) Int. Cl.
*F21K 9/64* (2016.01)
*F21V 9/32* (2018.01)
(Continued)

(52) U.S. Cl.
CPC .................. *F21K 9/64* (2016.08); *F21V 9/32* (2018.02); *F21V 9/38* (2018.02); *F21Y 2115/30* (2016.08)

(58) Field of Classification Search
CPC .. F21S 41/176; F21K 9/64; F21V 9/32; F21V 13/14; F21V 9/38; F21V 9/45; H01S 5/0087; G03B 21/204; F21Y 115/30
See application file for complete search history.

(56) References Cited

U.S. PATENT DOCUMENTS

| | | | | |
|---|---|---|---|---|
| 6,580,097 | B1 * | 6/2003 | Soules | C09K 11/7731 313/503 |
| 7,703,942 | B2 * | 4/2010 | Narendran | H10H 20/855 362/240 |
| 2017/0219171 | A1 | 8/2017 | Sorg | |

FOREIGN PATENT DOCUMENTS

| | | | |
|---|---|---|---|
| WO | 2017036789 | A1 | 3/2017 |
| WO | 2020114894 | A1 | 6/2020 |

(Continued)

*Primary Examiner* — William J Carter

(57) ABSTRACT

The invention provides in embodiments a light generating system (1000) comprising a first light generating device (100), a first luminescent material (210), and a second luminescent material (220), wherein: A) the first light generating device (110) is configured to generate first device light (111), wherein the first light generating device (110) comprises a first light source (10) selected from the group of a superluminescent diode and a laser; B) the first luminescent material (210) comprises a line absorber and line emitter luminescent material providing a first luminescent material emission (211) comprising a line emission at a first wavelength ($\lambda_{L,1}$) upon excitation with the first device light (111); C) the second luminescent material (220) comprises a broad band emitter luminescent material providing a second luminescent material emission (221) comprising a broad band emission upon excitation with the first device light (111), wherein the second luminescent material emission (221) has a second centroid wavelength ($\lambda_{LC,2}$), wherein $|\lambda_{L,1}-\lambda_{LC,2}|\leq 20$ nm; D) the first light generating device (110) is configured to pump one or more of the first luminescent material (210) and the second luminescent material (220)

(Continued)

with the first device light (111); and E) the light generating system (1000) is configured to generate system light (1001) comprising one or more of the first luminescent material emission (211) and the second luminescent material emission (221).

15 Claims, 6 Drawing Sheets

(51) Int. Cl.

| | |
|---|---|
| ***F21V 9/38*** | (2018.01) |
| ***F21Y 115/30*** | (2016.01) |

(56) References Cited

FOREIGN PATENT DOCUMENTS

| | | | |
|---|---|---|---|
| WO | 2021032690 | A1 | 2/2021 |
| WO | 2021219442 | A1 | 11/2021 |

* cited by examiner

HIGH BRIGHTNESS LIGHT SOURCE

CROSS-REFERENCE TO PRIOR APPLICATIONS

This application is the U.S. National Phase application under 35 U.S.C. § 371 of International Application No. PCT/EP2023/051565, filed on Jan. 23, 2023, which claims the benefit of European Patent Application No. 22153708.7, filed on Jan. 27, 2022. These applications are hereby incorporated by reference herein.

FIELD OF THE INVENTION

The invention relates to a light generating system and to a lighting device comprising such light generating system.

BACKGROUND OF THE INVENTION

Conversion devices are known in the art. US2017/0219171, for instance, describes a conversion device, comprising: a phosphor element made of a phosphor element material for converting pump radiation into conversion radiation; and a scattering element embodied as a volume scatterer; wherein the scattering element is arranged in direct optical contact with the phosphor element in order to be transilluminated by the conversion radiation; and wherein the phosphor element material is present in monocrystalline form in the phosphor element over a volume of at least $1\times10^{-2}$ $mm^3$.

SUMMARY OF THE INVENTION

While white LED sources can give an intensity of e.g. up to about 300 $lm/mm^2$; static phosphor converted laser white sources can give an intensity even up to about 20.000 $lm/mm^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

Possible problems associated with systems based on laser pumps and/or pumped luminescent crystals may be that the spectral properties may (slightly) change over time and/or may (slightly) change as function of temperature (during operation). As lasers may generate relatively narrow emission bands and as line absorbers may be relatively sensitive to spectral changes of the excitation, the spectral properties of the light of system may vary over time. However, this may in general be less desirable.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative.

Hence, in a first aspect the invention provides a light generating system ("system") comprising a first light generating device, a first luminescent material, and a second luminescent material. In embodiments, the first light generating device may especially be configured to generate first device light. Further, in embodiments the first light generating device may comprise a first light source. Especially, in embodiments the first light source may be selected from the group of a superluminescent diode and a laser. In embodiments, the first luminescent material may comprise a line absorber and line emitter luminescent material. In embodiments, the first luminescent material may provide a first luminescent material emission ("first luminescent material light") comprising a line emission at a first wavelength $\lambda_{L,1}$ upon excitation with the first device light. Further, especially the second luminescent material may comprise a broad band emitter luminescent material. In embodiments, the broad band emitter luminescent material may provide a second luminescent material emission ("second luminescent material light"), especially comprising a broad band emission upon excitation with the first device light. In embodiments, the second luminescent material emission has a second centroid wavelength $\lambda_{LC,2}$. Especially, in embodiments $|\lambda_{L,1}-\lambda_{LC,2}|\leq30$ nm, more especially $\lambda_{L,1}$- $\lambda_{LC,2}|\leq25$ nm, such as even more especially $|\lambda_{L,1}-\lambda_{LC,2}|\leq20$ nm. In specific embodiments, the first light generating device may be configured to pump one or more of the first luminescent material and the second luminescent material with the first device light. Further, especially the light generating system may be configured to generate system light comprising in an operational mode (of the system) one or more of the first luminescent material emission and the second luminescent material emission. Hence, the invention provides in embodiments a light generating system comprising a first light generating device, a first luminescent material, and a second luminescent material, wherein: (A) the first light generating device is configured to generate first device light, wherein the first light generating device comprises a first light source selected from the group of a superluminescent diode and a laser; (B) the first luminescent material comprises a line absorber and line emitter luminescent material providing a first luminescent material emission comprising a line emission at a first wavelength $\lambda_{L,1}$ upon excitation with the first device light; (C) the second luminescent material comprises a broad band emitter luminescent material providing a second luminescent material emission comprising a broad band emission upon excitation with the first device light, wherein the second luminescent material emission has a second centroid wavelength $\lambda_{LC,2}$, wherein $|\lambda_{L,1}-\lambda_{LC,2}|\leq20$ nm; (D) the first light generating device is configured to pump one or more of the first luminescent material and the second luminescent material with the first device light; and (E) the light generating system is configured to generate system light comprising one or more of the first luminescent material emission and the second luminescent material emission.

With such system it may be possible to provide system light having a high CRI. Further, with such system it may be possible to provide high intensity system light. Yet, with such system it may be possible to provide relatively efficiently high intensity system light. Further, with such system the reliability may be higher. Hence, over time the output may be spectrally more stable. Further, in embodiments it may be possible to control the system light, and thereby control one or more of color point, color rendering index, and correlated color temperature.

As indicated above, the light generating system may comprise a first light generating device, a first luminescent material, and a second luminescent material.

The first light generating device may especially be configured to generate first device light. Especially, the first light generating device may comprise a first light source. The first light source may especially configured to generate first light source light. In embodiments, the first device light may essentially consist of the first device light. In specific embodiments, the first light source may comprise a first laser device, such as a diode laser. Hence, in specific embodiments the first light source light may comprise first laser device light. Therefore, in specific embodiments the first device light may essentially consist of first laser device light. Hence, as also indicated below, in embodiment the light generating system may comprise a first laser device. The term "first laser device" may also refer to a plurality of essentially the same type of first laser devices, like from the same bin. Alternatively or additionally, in specific embodiments the first light source may comprise a first superluminescent diode. Hence, in specific embodiments the first light source light may comprise first superluminescent diode light. Therefore, in specific embodiments the first device light may essentially consist of first superluminescent diode light. Hence, as also indicated below, in embodiment the light generating system may comprise a first superluminescent diode. The term "first superluminescent diode" may also refer to a plurality of essentially the same type of first superluminescent diodes, like from the same bin.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode (OLED), such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED. The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like a LED, and an optical filter, which may change the spectral power distribution of the light generated by the light source. Especially, the "term light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser). However, other embodiments may also be possible.

Hence, in embodiments the light source comprises a laser light source. In embodiments, the terms "laser" or "solid state laser" or "solid state material laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:$CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:$YCa_4O(BO_3)_3$ or Nd:YCOB, neodymium doped yttrium orthovanadate (Nd:$YVO_4$) laser, neodymium glass (Nd:glass) laser, neodymium YLF (Nd:YLF) solid-state laser, promethium 147 doped phosphate glass (147$Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride (U:$CaF_2$) solid-state laser, Ytterbium doped glass laser (rod, plate/chip, and fiber), Ytterbium YAG (Yb:YAG) laser, $Yb_2O_3$ (glass or ceramics) laser, etc.

For instance, including second and third harmonic generation embodiments, the light source may comprise one or more of an F center laser, an yttrium orthovanadate (Nd:$YVO_4$) laser, a promethium 147 doped phosphate glass (147$Pm^{3+}$:glass), and a titanium sapphire (Ti:sapphire; $Al_2O_3$:$Ti^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. Hence, in embodiments lasers in a laser bank may share the same optics.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially 1° (FWHM), most especially 0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc. The term "solid state light source", and similar terms, may especially refer to semiconductor light sources, such as a light emitting diode (LED), a diode laser, or a superluminescent diode. The term "laser light source" may e.g. refer to a diode laser or a solid state laser, etc.

Superluminescent diodes are known in the art. A superluminescent diode may be indicated as a semiconductor device which may be able to emit low-coherence light of a broad spectrum like a LED, while having a brightness in the order of a laser diode.

US2020192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

Therefore, in embodiments the first light generating device may be configured to generate first device light, wherein the first light generating device comprises a first light source selected from the group of a superluminescent diode and a laser.

Especially, the first light generating device, optionally in combination with an optional element, generate first device light that may have a relatively narrow bandwidth. In embodiments, the first device light may comprise spectral band (or device light emission band) having a full width half maximum selected from the range of <40 nm, such as ≤35 nm, like in embodiments ≤30 nm. Yet further, the first device light may comprise a spectral band having a full width half maximum selected from the range of ≤25 nm, such as ≤20 nm, like even smaller, such as ≤15 nm, or ≤10 nm. Especially, in embodiments the first light generating device comprises a laser. More especially, in specific embodiments the first light generating device is a laser. Hence, the first light generating device, optionally in combination with an optical element, may be configured to generate laser light (i.e. the first device light may be laser light), having a relative narrow bandwidth (or line width). In this way, a slight mismatch of the excitation band, i.e. the spectral band (especially a spectral line) of the first light generating device and the absorption band, more especially absorption line, of the first luminescent material, may lead to a substantial reduction in the intensity of the generate first luminescent material light.

At least part of the first device light may be used to pump the first luminescent material. Alternatively or additionally, the first device light may be used to pump the second luminescent material.

The first luminescent material and the second luminescent material may differ in that they have different spectral power distributions upon exciting with (essentially the same) first device light. In essentially the same emission spectral range, the first luminescent material may show essentially line emission (or narrow band emission) whereas the second luminescent material may show essentially band emission (or broad band emission).

Alternatively or additionally, the first luminescent material and the second luminescent material may differ in that they have in essentially the same excitation spectral range, (substantially) different excitation spectra. The first luminescent material may substantially only have line absorption (or narrow band absorption) whereas the second luminescent material may show essentially band absorption (or broad band absorption).

Hence, the first luminescent material and the second luminescent material may e.g. comprise different activators, or the same activators in different host lattices and/or with different ligands, or the same activators in different oxidation states, etc.

Especially, the line emitter and/or line absorber may be based on a transition metal and/or a lanthanide metal, especially on a lanthanide metal. The latter may have f-f transitions which are relatively narrow lines compared to more allowed d-d transitions or f-d transitions. Hence, the first luminescent material may be excitable in a narrow band and may especially be a line absorber, and may also emit, upon such excitation, a narrow band, especially a line emission. Especially, the first luminescent material has one or more line absorption, such as due to one or more f-f transitions, in the spectral wavelength range where the first device light is provided; and upon excitation with (such) first device light, the first luminescent material may provide line emission, such as due to one or more f-f transitions.

The broad band emission may especially be based on $Eu^{2+}$ and/or $Ce^{3+}$. However, luminescent materials not based on f-f transitions or not based on $Eu^{2+}$ and/or $Ce^{3+}$, are herein not excluded.

Here below, some embodiments in relation to luminescent materials in general are described.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc, and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x^{2+}x3=1$, wherein $x3>0$, wherein $0<x^{2+}x3\leq 0.2$, wherein $y1+y2=1$, wherein $0\leq y2\leq 0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq 0.1$, and wherein $0\leq y2\leq 0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein $0<x3\leq 0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein $0<x2+x3\leq 0.2$, wherein y1+y2=1, wherein $0\leq y2\leq 0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $MS:Eu^{2+}$ and/or $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr, and Ca, especially in embodiments at least Sr. Hence, in embodiments, the luminescent may comprise one or more materials selected from the group consisting of (Ba,Sr,Ca)S:Eu, $(Ba,Sr,Ca)AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr, or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, $(Ba,Sr,Ca)AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr, or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials. Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In specific embodiments, the first luminescent material comprises a line absorber and line emitter luminescent material providing a first luminescent material emission comprising a line emission at a first wavelength $\lambda_{L,1}$ upon excitation with the first device light. The first luminescent may also have more than one line emission (when the first luminescent material is excited by the first device light), especially each having a different emission wavelength, as is known for a number of f-f transitions (see e.g. also the Dieke Diagram (G. H. Dieke and H. M. Crosswhite, Applied Optics Vol. 2, Issue 7, pp. 675-686 (1963)•doi: 10.1364/AO.2.000675). Hence, the term "line emission" may also refer to emissions comprising a doublet, triplet, . . . , etc. structure. For instance, the $^3P_0 \rightarrow {}^3H_6$ transition of $Pr^{3+}$ leads to multiplet emission due to the $^3H_6$ (final) level.

Further, especially the second luminescent material may comprise a broad band emitter luminescent material providing a second luminescent material emission comprising a broad band emission upon excitation with the first device light. Hence, with essentially the same excitation wavelength, the line emission and the broad band emission can be generated. Further, especially the line emission and the broad band emission at least partly overlap. More especially, in embodiments at substantially all the wavelengths of the line emission also the broad band emitter emits light (and of course also at other wavelengths, as it is a broad band emitter).

Further, at one or more wavelengths where the first luminescent material may be excited by the first device light, also the second luminescent material may be excited. Hence, the excitation spectrum of the first luminescent material and the excitation spectrum of the second luminescent material may at least partially overlap. In specific embodiments, the excitation spectrum of the first luminescent material may have one or more narrow bands that at least partially overlap an excitation band of the excitation spectrum of the second luminescent material.

In embodiments, the line emission at a first wavelength $\lambda_{L,1}$ may have a full width half maximum linewidth selected from the range of <40 nm, such as ≤35 nm, like in embodiments ≤30 nm. Yet further, the line emission at a first wavelength $\lambda_{L,1}$ may have a full width half maximum linewidth selected from the range of ≤25 nm, such as ≤20 nm, like even smaller, such as ≤15 nm, or ≤10 nm.

The second luminescent material may be chosen such that an emission band of a full width half maximum (of the luminescent material light) of at least 40 nm, such as at least 50 nm is obtained. For instance, the second luminescent material may be chosen such that an emission band of a full width half maximum of at least 60 nm, is obtained. This may e.g. be the case with trivalent cerium comprising garnet luminescent materials (as described herein). Hence, especially the second luminescent material may comprise a broad band emitter. The second luminescent material may also comprise a plurality of broad band emitters. Especially, when two or more second luminescent materials are applied to convert at least part of the first device light and/or at least part of the second device light, at least two of the two or more second luminescent materials may be configured to provide respective second luminescent material light each having an emission band with full width half maximum (of the luminescent material light) of at least 40 nm, such as at least 50 nm.

Especially, the emissions may be determined when the luminescent material is at room temperature, i.e. about 20° C.

Hence, in specific embodiments at room temperature (i) the line emission at a first wavelength $\lambda_{L,1}$ has a full width half maximum linewidth selected from the range of ≤20 nm, and (ii) the broad band emission has a full width half maximum bandwidth of ≥40 nm.

In embodiments, the line absorber and line emitter luminescent material may be selected from (a) $ALnF_4$:$Tb^{3+}$, wherein A is selected from the group of Li, Na, and K, and wherein Ln is selected from the group of Y, La, Gd, and Lu, and (b) $M1_{0.7}Ln_{0.3}M2_{0.3}Al_{11.7}O_{19}$:$Pr^{3+}$, wherein M1 is selected from the group of Ca, Sr, and Ba, wherein Ln is selected from the group of Y, La, Gd, and Lu, and wherein M2 is selected from the group of Mg and Ca. Especially, in specific embodiments the line absorber and line emitter luminescent material may be selected from (a) $LiLuF_4$:$Tb^{3+}$ and (b) $Sr_{0.7}La_{0.3}Mg_{0.3}Al_{11.7}O_{19}$:$Pr^{3+}$. Alternatively or additionally, the broad band emitter luminescent material may comprise one or more of a divalent europium containing nitride, a divalent europium containing oxynitride, a divalent europium containing silicate, a divalent europium containing sulfide, a divalent europium containing selenide, a cerium comprising garnet, and a quantum structure. In yet more specific embodiments, the broad band emitter luminescent material may comprise one or more of MS:$Eu^{2+}$, $M_2Si_5N_8$:$Eu^{2+}$, $MAlSiN_3$:$Eu^{2+}$, and $Ca_2AlSi_3O_2N_5$:$Eu^{2+}$, wherein M comprises one or more of Ba, Sr, and Ca, especially in embodiments at least Sr.

In embodiments, the first luminescent material emission and the second luminescent material emission may have substantially the same color points.

In specific embodiments, colors, or color points of a first type of light and a second type of light may be essentially the same when the respective color points of the first type of light and the second type of light differ with at maximum 0.1 for u' and/or with at maximum 0.1 for v', even more especially at maximum 0.05 for u' and/or with at maximum 0.05 for v'. In more specific embodiments, colors, or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram. Optionally, these values apply after passing one or more optical filters, which may filter out part(s) of one or more of the first luminescent material emission and the second luminescent material emission (see further also below).

The second luminescent material emission may have a second centroid wavelength $\lambda_{LC,2}$. The term "centroid wavelength", also indicated as kc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c = \Sigma\lambda * I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

In embodiments, a peak wavelength of the line emission may be relatively close to the centroid wavelength of the second luminescent material emission, more especially of the broad band emission. Especially, in embodiments $\lambda_{L,1}$-$\lambda_{LC,2}$|≤30 nm, more especially $|\lambda_{L,1}-\lambda_{LC,2}|\leq 20$ nm. Especially in embodiments, wherein $|\lambda_{L,1}-\lambda_{LC,2}|\leq 10$ nm.

When the first luminescent material has more than one emission lines in the emission wavelength range of the second luminescent material, the as peak wavelength, the wavelength of the highest peak may be chosen.

As indicated above, the first light generating device may be configured to pump one or more of the first luminescent material and the second luminescent material with the first device light.

In embodiments, during a time period, the first light generating device may be configured to pump the first luminescent material or during another time period, not overlapping with the previous mentioned time period, the first light generating device may be configured to pump the second luminescent material. In embodiments, during a time period the first light generating device may be configured to pump the first luminescent material and the second luminescent material. Hence, in embodiments the light generating system may (consequently) be configured to generate system light comprising one or more of the first luminescent material emission and the second luminescent material emission.

In embodiments, a primary first light generating device may be configured to provide to first device to the first luminescent material and a secondary first light generating device is configured to provide first device light to the second luminescent material. In this way, it may be possible, such as in embodiments when using a control system that may individually control the primary first light generating device and the secondary first light generating device, to control a ratio of intensities of the first luminescent material emission and second luminescent material emission.

In embodiments, the first device light may be splitted in at least two parts, of which a first part may be directed to the first luminescent material and a second part one may be directed to the second luminescent material. In specific embodiments, the ratio of the first part received by the first luminescent material and the second part received by the second luminescent material may in embodiments be fixed. In other embodiments, however, this ratio may be controllable, e.g. by a controllable splitter and/or by a controllable attenuation element, like an optical filter (of which the position may be controllable and/or which may have controllable optical features).

Hence, in these ways a relative intensity of the first luminescent material emission and the second luminescent material emission may depend on a control mode of a control system (see further also below) configured to control the first light generating device and optional controllable optics.

In yet other embodiments, the second luminescent material may be configured downstream of the first luminescent material. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". Especially, the second luminescent material may be configured downstream of the first luminescent material, relative to the first light generating device. This may have as impact that when for any reason part of the first device light is not absorbed by the first luminescent material, this non-absorbed part may be at least partly absorbed by the second luminescent material. The phrase "relative to the first light generating device", and similar phrases, may especially refer to relative to the propagation (direction) of the first device light of the first light generating device.

For instance, it may be in embodiments that the spectral power distribution of the first device light may (slightly) depend on its operation temperature. Further, it may be that the spectral power distribution of the first device light may be controllable, such as e.g. in the case of a superluminescent diode or a VCSEL (see also below). Hence, at one or more first wavelengths the line absorber may be excited, where also the second luminescent material may be excited, and at one or more other wavelengths, e.g. within about 20 nm, such as within about 10 nm of the first wavelengths, the line absorber may have a relatively lower excitation, or even not be excitable, whereas the second luminescent material may be excited. With relatively narrow absorption lines, as may be the case for f-f transitions, a slight change in excitation wavelength may lead to very different emission intensities, or even no excitation at all of the first luminescent material; however, the second luminescent material may be excited with such (slightly) shifted light. Hence, a shift of the spectral power distribution of the first device light may lead to a smaller or larger absorption of the first device light by the first luminescent material and may thus also lead to a larger or smaller absorption, respectively, of the first device light by the second luminescent material. Even though the relatively sharp bands, such as f-f transitions may be relatively insensible to temperature, there may be a line broadening, leading to relatively higher absorption at the wings and relatively lower absorption in the peak maximum, and/or there may be some line shift due to temperature. The latter may be small. Hence, when the temperature of the luminescent material changes over time due to heating up of the luminescent material, or due to temperature changes of the luminescent material as a result of changes in radiant flux of the first device light received over time, the absorption of the first device light may also change. Thereby, also a ratio of the line emission and the broad band emission may be variable. Hence, in embodiments a relative intensity of the first luminescent material emission and the second luminescent material emission depends on one or more of (i) a spectral power distribution of the first device light, and (ii) a temperature of the first luminescent material. In this way, when the first luminescent material generates less line emission, the second luminescent material may take over. In this way, the change in intensity in the spectral range of the line emission may be less influenced than in the absence of the second luminescent material.

Due to a downstream position of the second luminescent material, with the first luminescent material and the first light generating device configured upstream, respectively, in a kind of automatic way, the second luminescent material may take over when due to a spectral mismatch, the first luminescent material converts less first device light (see also below). Such mismatch may e.g. be due to temperature effects or lifetime effects, etc.

A vertical-cavity surface-emitting laser, or VCSEL, is known in the art and may especially be a type of semiconductor laser diode with laser beam emission perpendicular from the top surface, contrary to edge-emitting semiconductor lasers (also in-plane lasers) which emit from surfaces formed by cleaving the individual chip out of a wafer. VCSELs may be tunable in emission wavelength, as known in the art. For instance, Dupont et al., Applied Physics Letters 98(16):161105-161105-3, DOI:10.1063/1.3569591, or Wendi Chang et al., Applied Physics Letters 105(7): 073303, DOI:10.1063/1.4893758, or Thor Ansbaek, IEEE Journal of Selected Topics in Quantum Electronics 19(4): 1702306-1702306, DOI:10.1109/JSTQE.2013.2257164, or C. J. Chang-Hasnain, IEEE Journal of Selected Topics in Quantum Electronics (Volume: 6, Issue: 6, November-December 2000), DOI: 10.1109/2944.902146, or Kogel et al., IEEE Sensors Journal, December 2007, volume 7, no. 11, pages 1483-1489, or Jayaraman, et al., Electron Lett. 2012 Jul. 5; 48(14): 867-869, doi: 10.1049/el.2012.1552, all document herein incorporated by reference, describe emission wavelength tunable VCSELs. Especially, with varying electrical voltage, the spectral power distribution of the VCSEL may vary. Hence, the term "VCSEL" may thus especially refer herein to a tunable VCSEL, as known in the art. Such tunable VCSELs may be based on MEMS technology. Such (tunable) VCSEL may also be indicated as "MEMS VCSEL". Therefore, in embodiments the laser diode may comprise a vertical-cavity surface-emitting laser (VCSEL) that has single-mode light emission and a long coherence length. The wavelength sweep may be implemented using a micro-electro-mechanical system (MEMS) to change the length of the laser cavity by which a stable and rapid wavelength sweep results.

Hence, with a VCSEL different spectral power distributions may be generated. Especially, the VCSEL may be configured to generate (during operation of the VCSEL) laser light. Therefore, the (VCSEL) laser light may have a controllable spectral power distribution. To control the spectral power distribution the (VCSEL) laser light, a control system may be applied. The control system may be configured to control the spectral power distribution of the (VCSEL) laser light.

It may also be that the light generating device has some change in spectral power distribution over time. For instance, over lifetime there may be some change in the spectral power distribution. Hence, with the use of the second luminescent material, the impact on the intensity in the spectral range of the line emission may be less influenced than in the absence of the second luminescent material. Hence, in embodiments a relative intensity of the first luminescent material emission and the second luminescent material emission may depend on an operation time of the first light generating device.

Hence, in embodiments a relative intensity of the first luminescent material emission and the second luminescent material emission may (alternatively or additionally) depend on one or more of (i) an operation time of the first light generating device, and (ii) a control mode of a control system configured to control the first light generating device and optional controllable optics.

Therefore, in a first operational mode of the system, a radiant flux of the first luminescent material emission may be higher than a radiant flux of the second luminescent material emission, and in a second operational mode of the system a radiant flux of the first luminescent material emission may be lower than a radiant flux of the second luminescent material emission. Hence, in the first operational mode there may be a first ratio between the radiant flux of the second luminescent material emission and the radiation flux of the first luminescent material emission and in the second operational mode there may be a second ratio between the radiant flux of the second luminescent material emission and the radiation flux of the first luminescent material emission. In embodiments, the ratio's may have a ratio of at least 2, such as at least 5. However, in other embodiments the absorption of the first device light by the first luminescent material in the first operational mode may essentially be complete, and thus in the first operational mode the radiant flux of the second luminescent material emission may essentially be zero. Alternatively or additionally, in yet other embodiments the absorption of the first device light by the first luminescent material in the second operational mode may essentially be zero, and thus in the second operational mode the radiant flux of the first luminescent material emission may essentially be zero.

The phrase "control a ratio of intensities of the first luminescent material emission and second luminescent material emission", and similar phrases, may e.g. refer to control a ratio of radiant fluxes of the first luminescent material emission and second luminescent material emission.

In embodiments, the control system may control radiation fluxes of the first luminescent material emission and second luminescent material emission.

The term "first operational mode" may also refer to a plurality of different first operational modes. Likewise, term "second operational mode" may also refer to a plurality of different second operational modes.

It may be that the spectral power distribution of the first luminescent material may have to be tuned, e.g. filtering out of non-desired transitions. To this end, an optical element, like an optical filter may be applied. The spectral power distribution of the first luminescent material emission downstream of the optical element may be different from the spectral power distribution of the first luminescent material emission upstream of the optical element. When the spectral power distribution of the first luminescent material emission downstream of the optical element is usable, or when without an optical element the spectral power distribution of the first luminescent material emission is usable, then to characterize the spectral power distribution of the first luminescent material emission also the centroid wavelength may be used (see definition above).

Hence, in embodiment the system may further comprise a first optical element configured downstream of the first luminescent material, wherein the first luminescent material emission downstream of the first optical element has first centroid wavelength $\lambda_{LC,1}$. Especially, in embodiments $|\lambda_{LC,1}-\lambda_{LC,2}|\leq 30$ nm, more especially $\lambda_{LC,1}-\lambda_{LC,2}|\leq 25$ nm, yet even more especially $|\lambda_{LC,1}-\lambda_{LC,2}|\leq 20$ nm. For instance, in embodiments $|\lambda_{LC,1}-\lambda_{LC,2}|\leq 10$ nm.

In specific embodiments, the first luminescent material may be a laser crystal or laser glass, and the first device light may be used as pump light source to generate laser light. Especially, this may be the case when the first device comprises a laser device.

Hence, in embodiments the system may comprise first laser arrangement (or "first laser"), comprising a pump laser, which may be provided by the first light generating device, and a laser crystal or laser glass, comprising the first luminescent material. The first laser arrangement may also be indicated as solid state material laser arrangement.

With respect to the first laser arrangement, it is noted that this may comprise a solid state material laser. Especially, such laser may comprise a pump light source, more especially a laser light source, like a diode laser, and a laser body, such as a laser crystal or laser glass, that can be brought into lasing. Such laser body may be configured between mirrors, as known in the art, to provide a cavity. One of the mirrors may be partly transmissive for the pump light source light, and substantially reflective for the luminescent material light of the laser body, and the other one of the mirrors may be partly transmissive for the luminescent material light. In this way, a laser cavity may be provided. Examples of such luminescent materials which can be used in a solid state material laser are also indicated above.

Hence, in embodiments the first laser arrangement may comprise a pump laser, wherein the pump laser may be configured to generate (in the first operational mode (of the light generating system)) pump laser light. Especially, the pump laser may comprises a diode laser. Other lasers, however, may also be possible.

Further, the first laser arrangement device may comprise a luminescent material based on lanthanide materials having relatively sharp spectral f-f transitions, especially a trivalent lanthanide based luminescent material. Hence, the laser body may comprise a trivalent lanthanide based luminescent material.

As indicated above, especially the luminescent materials may be based on lanthanide materials having relatively sharp spectral f-f transitions. By appropriately selected the lanthanide as well as its host material, and the spectral power distribution of the first light generating device, it is possible to generate a laser comprising the luminescent material with the host material comprising the specific lanthanide, which can be pumped to lasing with the first light generating device.

It appears that especially suitable may be luminescent materials which comprise (trivalent) terbium ($4f^8$ configuration) as dopant and/or (trivalent) praseodymium ($4f^2$ configuration). With such lanthanide ions, it may be possible to generate light in the desired wavelength range(s). The term "terbium based luminescent material" or the term "praseodymium based luminescent material" especially refers to luminescent materials wherein terbium or praseodymium, respectively, are dopants (like e.g. trivalent cerium or divalent europium in above-mentioned luminescent materials).

As an excitation of a lanthanide ion may lead to different emissions, it may be possible to select the mirrors such that one emission transition may be get into lasing, whereas other emission transitions are much less or not stimulated. Hence, in this way it may be possible to use the same luminescent material for different types of laser light. Further, the host materials may have some impact on the emission transitions in terms of wavelength and in terms of oscillator strength. Hence, the same type of lanthanide ion may be used in different optical cavities to get different types of laser light.

In embodiments, the lanthanide based luminescent material may comprise a trivalent terbium based luminescent material. Instead of or in addition to a trivalent terbium based luminescent material, a praseodymium based material may be applied. Hence, in embodiments the lanthanide based luminescent material may comprise a praseodymium based luminescent material, and/or the lanthanide based luminescent material may comprise a praseodymium based luminescent material.

In embodiments, the laser may comprise an arrangement comprising a laser cavity and a single crystal comprising the lanthanide based luminescent material, wherein the single crystal is configured within the laser cavity. Alternatively, instead of a single crystal, a glass body or a ceramic body may be applied. Especially, the arrangement comprises a reflector and a second reflector, wherein the reflector is arranged upstream of the crystal (or glass (or ceramic body)) and wherein the second reflector is arranged downstream of the crystal (or glass (or ceramic body)), wherein the reflector is light transmissive for the device light and reflective for the laser light, wherein the second reflector is reflective for the device light and partially reflective for the laser light. With such reflectors, device light can enter the laser cavity, but return in a direction of the light generating device may be reduced. Further, with such reflectors, transmission of the device light through the second reflector may be reduced, such that reflected device light may have another chance to be converted by the lanthanide based material. Especially, the second reflector is also partially transmissive for the laser light. In this way, part of the laser light may be used to support stimulated emission, and part of the laser light may escape via the second reflector. Hence, in specific embodiment the reflector may also be partially reflective for the laser light.

Hence, in embodiments the trivalent lanthanide based luminescent material may be comprised by a glass body, a single crystal, or a ceramic body, especially a glass body or a single crystal, such as a single crystal. For instance, $ALnF_4:Tb^{3+}$ may be provided as single crystal. Other trivalent terbium based materials may e.g. be provided as glass or single crystal. A glass body, a single crystal, or a ceramic body may thus be used as laser body. In embodiments, the trivalent lanthanide based solid state material light source may especially be configured to convert at least part of the pump laser light into solid state material laser light.

In embodiments, the term "laser cavity" may refer to the arrangement of the reflector and the second reflector; the lanthanide based luminescent material may be configured in between the reflector and the second reflector.

Therefore, amongst others the invention provides in embodiments a light generating system as defined herein, wherein the first laser arrangement device is configured to generate (in the first operational mode (of the light generating system)) first solid state material laser light, wherein the first laser arrangement comprises a pump laser, wherein the pump laser is configured to generate (in the first operational mode (of the light generating system)) pump laser light, (wherein the pump laser comprises a diode laser or other type of laser) wherein the trivalent lanthanide based solid state material light source is configured to convert at least part of the pump laser light into solid state material laser light, wherein first solid state material laser light comprises the solid state material laser light.

Therefore, in specific embodiments the light generating system may comprise a first laser arrangement comprising a first laser cavity and a first crystal comprising the first luminescent material emission, wherein the first crystal is configured within the first laser cavity; wherein the first laser arrangement comprises a first reflector and a second reflector, wherein the first reflector is arranged upstream of the first crystal and wherein the second reflector is arranged downstream of the first crystal, wherein the first reflector is light transmissive for the first device light and reflective for the line emission at a first wavelength $\lambda_{L,1}$, wherein the second reflector is reflective for the first device light and partially reflective for the line emission at a first wavelength $\lambda_{L,1}$; wherein the first laser arrangement is configured to generate first laser light comprising the line emission at a first wavelength $\lambda_{L,1}$. Especially, the first laser light downstream of the second reflector may comprise at least part of the first luminescent material emission and may in embodiments have a first centroid wavelength $\lambda_{LC,1}$, wherein $|\lambda_{LC,1}-\lambda_{LC,2}|\leq 20$ nm. Instead of a single crystal, a glass may be applied. This may depend upon the type of (solid state) material.

Hence, in embodiments the relevant first luminescent material emission may be the emission of the first luminescent material, comprising the desired line emission, or optionally optically filtered first luminescent material emission, comprising the desired line emission. As indicated above, it may also be possible to use a first luminescent material that may be brought in a lasing mode. Especially, in such embodiments the relevant luminescent material emission may essentially consist of the desired line emission. Further, especially in such embodiments the first light generating device may comprise a laser.

Therefore, in specific embodiments the first device and first luminescent material may be configured to provide stimulate emission comprising at least part of the first luminescent material emission. Hence, the first luminescent material emission may in embodiments be stimulated emission (using lasing).

Therefore, in embodiments the first luminescent material may be a lasing material.

Alternatively or additionally, in embodiments an optical filter may be configured downstream of the second luminescent material. The spectral power distribution of the second luminescent material light upstream of the optical filter and downstream of the optical filter may differ. In this way, the spectral power distribution of the second luminescent material may be tuned, e.g. to have a color point closer to the color point of the first luminescent material light.

In embodiments, the first light generating device may be configured to generate blue first device light.

In embodiments, (in an operational mode) the system light may comprise the first device light, the first luminescent material emission, and the second luminescent material emission. Especially, this may be the case when the first device light is blue light.

In embodiments, the first luminescent material emission and the second luminescent material emission may be green light. Alternatively, the first luminescent material emission and the second luminescent material emission may be yellow light. Alternatively, the first luminescent material emission and the second luminescent material emission may be orange light. Alternatively, the first luminescent material emission and the second luminescent material emission may be red light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

The spectral power distribution on the basis of one or more of the first luminescent material emission and the second luminescent material emission, and optionally the first device light, may have a spectral power distribution which may be desirable for some applications but may not be desirable for some other applications. Hence, in embodiments system may further comprise a second source of light.

Especially, the second source of light may be configured to generate second light, having a spectral power distribution different from (a) the first device light, (b) the first luminescent material emission, and (c) the second luminescent material emission. Especially, the difference may be in the color point. Hence, the spectral power distributions are different. Further, the difference may thus be in embodiments in the centroid wavelength. In embodiments, the second source of light is or provides light have a color different from the color of the first luminescent material emission and the second luminescent material emission. For instance, in embodiments (a) the second source of light and (b) the first luminescent material emission and second luminescent material emission may be selected from green, yellow, orange, and red. For instance, in embodiments the second source of light may be selected from yellow, orange, and red, and the first luminescent material emission and second luminescent material emission may be green. For instance, in (other) embodiments the second source of light may be selected from green, yellow, and orange, especially green or yellow, and the first luminescent material emission and second luminescent material emission may be red. However, other combinations may also be possible.

In specific embodiments, colors, or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

Hence, (a) the second source of light and (b) the first luminescent material emission and second luminescent material emission may in embodiments differ with at least 0.02 for u' and/or with at least 0.02 for v', or more.

Spectral power distributions of different sources of light having centroid wavelengths differing least 10 nm, such as at least 20 nm, or even at least 30 nm may be considered different spectral power distributions, e.g. different colors.

Hence, (a) the second source of light and (b) the first luminescent material emission and second luminescent material emission may in embodiments have centroid wavelengths differing least 10 nm, or more.

Therefore, in embodiments (in an operational mode) the system light may comprise (a) one or more of the first device light and the second light, and (b) one or more of the first luminescent material emission and the second luminescent material emission. In further embodiments, embodiments (in an operational mode) the system light may comprise (a) the first device light and the second light, and (b) one or more of the first luminescent material emission and the second luminescent material emission.

Such second source of light may comprise a second light generating device, which may comprise e.g. a solid state light source. In embodiments, the second source of light may comprise one or more of a superluminescent diode and a laser. In embodiments, the second light generating device may be configured to generate second device light. Hence, in embodiments the second light may comprise the second device light.

The term "second light generating device" may also refer to a plurality of second light generating devices and may also refer to a plurality of different second light generating devices. For instance, the second light generating device may comprise one or more of a blue emitting light generating device and a red emitting light generating device, such as a blue laser and/or a red laser. Of course, other colors may also be possible. Hence, in embodiments the term "second light generating device" may refer to essentially any light generating device other than the first light generating device.

Alternatively or additionally, the second source of light may comprise a third luminescent material. Especially, the third luminescent material is different from the first luminescent material and the second luminescent material. The first luminescent material, the second luminescent material, and the third luminescent material may differ in one or more of activator type, activator amount, host lattice material, etc. Hence, the spectral power distribution of the first luminescent material emission and the third luminescent material emission may differ, and the spectral power distribution of the second luminescent material emission and the third luminescent material emission may differ; see above about different spectral power distributions having different u' and/or v' values, and/or having different centroid wavelengths. In embodiments, the third luminescent material may especially be configured to convert at least part of the first device light into third luminescent material light. Hence, in embodiments the second light may comprise the third luminescent material light. When a third luminescent material is available, it may be of the type $A_3B_5O_{12}:Ce^{3+}$, thought other materials, like described above, may also be possible.

As indicated above, the second source of light may comprise a third luminescent material that may be configured to convert at least part of the first device light into third luminescent material light. However, another luminescent material may also be provided that may be irradiated with another light source. Whereas the former option may be desirable as less types of light sources may be necessary, this latter option may allow a higher flexibility in choosing a pump light source and the luminescent material.

Hence, in embodiments the second source of light may comprise a fourth luminescent material and a second light source; wherein the second light source is configured to generate second light source light; wherein the fourth luminescent material is configured to convert at least part of the second light source light into fourth luminescent material light; wherein the second light comprises the fourth luminescent material light. Especially, in embodiments the second light source may be selected from the group of a superluminescent diode and a laser. The term "fourth luminescent material" is used to distinguish from the third luminescent material which may be pumped by the first light generating device. Any luminescent material not pumped by the first light generating device is herein indicated as fourth luminescent material. Hence, would both a third luminescent material and a fourth luminescent material be applied, they could in principle be even the same. When a fourth luminescent material is available, it may be of the type $A_3B_5O_{12}$:$Ce^{3+}$, thought other materials, like described above, may also be possible.

Hence, in embodiments one or more of the third luminescent material and the fourth luminescent material comprises a luminescent material of the type $A_3B_5O_{12}$:Ce, wherein A comprises one or more of Y, La, Gd, Tb and Lu, and wherein B comprises one or more of Al, Ga, In and Sc. In view of performance, such luminescent material may be desirable. They may e.g. be provided as ceramic body.

Therefore, in specific embodiments the light generating system may, further comprise a second source of light, wherein the second source of light is configured to generate second light, having a spectral power distribution different from (a) the first device light, (b) the first luminescent material emission, and (c) the second luminescent material emission; wherein (in an operational mode) the system light comprises (a) one or more of the first device light and the second light, and (b) one or more of the first luminescent material emission and the second luminescent material emission; wherein the second source of light comprises one or more of: (A) a second light generating device comprising one or more of a superluminescent diode and a laser, wherein the second light generating device is configured to generate second device light, wherein the second light comprises the second device light; (B) a third luminescent material configured to convert part of the first device light into third luminescent material light, wherein the second light comprises the third luminescent material light; and (C) a fourth luminescent material and a second light source selected from the group of a superluminescent diode and a laser; wherein the second light source is configured to generate second light source light; wherein the fourth luminescent material is configured to convert at least part of the second light source light into fourth luminescent material light; wherein the second light comprises the fourth luminescent material light; and wherein one or more of the third luminescent material and the fourth luminescent material comprises a luminescent material of the type $A_3B_5O_{12}$:Ce, wherein A comprises one or more of Y, La, Gd, Tb and Lu, and wherein B comprises one or more of Al, Ga, In and Sc.

In embodiments, the light generating system may be configured to provide white system light in an operational mode of the light generating system. This does not imply that the light generating system necessarily always generates white system light. In other embodiments, in another operational mode, the light generating system may be configured to provide colored system light.

The term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, in combination with a CRI of at least 70. In specific embodiments, the system light is white light and has correlated color temperature selected from a range from 1800 K to 12000 K, and a color rendering index of at least 70.

As indicated above, the second luminescent material may be configured downstream of the first luminescent material. It may be desirable to let the first luminescent material light not propagate to the second luminescent material, but propagate in another direction. Alternatively or additionally, it may be desirable that second luminescent material light does not propagate in an upstream direction and may reach the first luminescent material. Further, alternatively or additionally, it may be desirable that first device light reflected at the second luminescent material does not propagate in an upstream direction and may reach the first luminescent material (again). Therefore, in embodiments the light generating system may further comprise a second optical element configured between the first luminescent material and the second luminescent material, wherein the second optical element is either transmissive for the first device light and reflective for the first luminescent material emission, or reflective for the first device light and transmissive for the first luminescent material emission; and wherein the first device light the first luminescent material, the second luminescent material, and the second optical element are configured such that at least part of the first device light not absorbed by the first luminescent material propagates to the second luminescent material.

The light generating system may further comprise a control system (see also above). The control system may be configured to control (i) the first light generating device, or (ii) one or more of the first light generating device and controllable optics, (iii) one or more of the first light generating device and the second light generating device, or (iv) one or more of the first light generating device, the second light generating device, and controllable optics.

The phrase "controlling the first light generating device", and similar phrase, may refer to embodiments wherein there is a single first light generating device, but may in other embodiments also comprise controlling two or more (essentially identical) first light generating devices, such as lasers from the same bin. Likewise, the phrase "controlling the second light generating device", and similar phrase, may refer to embodiments wherein there is a single second light generating device, but may in other embodiments also comprise controlling two or more (essentially identical) second light generating devices, such as lasers from the same bin.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

With such system, it may be possible to provide light having a controllable spectral power distribution. Further, with such system it may be possible to provide light having a controllable correlated color temperature and/or a controllable color rendering index. Yet, with such system it may be possible to provide a spectral power distribution partially or substantially conformal to the spectral power distribution (in the visible) of a black body radiator (emission). The fact that the light generating system may be configured to generate (white) system light, does not exclude embodiments of the system, wherein the system may also be able to operate or be operated in other operational modes. Especially, in embodiments the spectral power distribution of the system light may be controllable. Hence, in embodiments in a first operational mode (of the light generating system), the light generating system may be configured to generate the white system light and in a second operational mode (of the light generating system) the light generating system may be configured to generate non-white system light.

Therefore, in embodiments the light generating system may further comprise a control system configured to control a spectral power distribution of the system light.

Especially, the control system may be configured to control the correlated color temperature of the system light at a value selected from the range of 1800-12000 K, such as selected from the range of 1800-6500 K, though other values are herein not excluded (see also above).

In specific embodiments, the correlated color temperature of the system light may be controllable over a CCT control range of at least 500 K within the range of 1800-12000 K, such as selected from the range of 1800-6500 K, such as controllable over a CCT control range of at least 1000 K. For instance, the CCT of the system light may controllable between 2700-4000 K (i.e. over a CCT control range of 1300 K), or over a range of 2000-4500 K (i.e. over a CCT control range of 2500 K). Hence, in embodiments, the CCT (of the white system light) may be controlled from a first value T1 to a second value T2, wherein $|T2-T1| \geq 500$ K, more especially $|T2-T1| \geq 1000$ K.

In embodiments, R9 (of the (white) system light) may be at least 0, such as especially at least 20, or even more especially at least 30. Alternatively, the R9 value may be controllable, such as over a range of at least 20 (like e.g. between 20-40). In specific embodiments, the control system may be configured to control (in the first operational mode (of the light generating system)) the R9 value of the system light at a value of at least 30; wherein the R9 value of the system light may be controllable over a R9 control range of at least 30, wherein the R9 control range at least partly overlaps with the range of at least 30. Further, in specific embodiments (in the first operational mode (of the light generating system)) the color rendering index of the system light may be at least 80. In embodiments, the control system may be configured to control the R9 value of the system light at a value of at least 30.

In embodiments, the control system may be configured to control the color rendering index (CRI) of the system light at least 60, more especially at least 70, yet even more especially at least 80. In embodiments, the R9 value (of the white system light) may be controlled from a first R9 value R9.1 to a second R9 value R9.2, wherein $|R9.2-R9.1| \geq 30$. Note that the CRI may also depend upon the spectral power composition. Hence, different types of white light may have different CRI values and/or different R9 values. In embodiments the control system may be configured to control (in an operational mode) the CRI value of the system light within a predetermined CRI range.

A change in a ratio of the radiative flux of the first luminescent material emission and the second material emission may lead to a change in the spectral power distribution of system light. Hence, it may be desirable to control the first light generating device as function of the spectral power distribution (of the system light). To this end, amongst others a sensor can be used that senses at least part of the system light, or optionally the first device light and/or device light of optional other sources. In dependence of the sensor signal, the first light generating device may be controlled. For instance, the radiative flux of the second luminescent material may be higher than the original radiative flux of the first luminescent material when due to a temperature or lifetime effect the first luminescent material absorbs less first device light. As the first luminescent material may have a higher absorption, the radiant flux may be higher. Therefore, a correction of the radiant flux of the first light generating device may be desirable in embodiments.

Hence, in embodiments the light generating system may further comprise a sensor and a control system, wherein the sensor is configured to sense an intensity of one or more of (a) the first luminescent material emission downstream of the first luminescent material, (b) the first device light downstream of the first luminescent material, (c) the second luminescent material emission downstream of the second luminescent material, (d) the first device light downstream of the second luminescent material, and generate a related sensor signal, wherein the control system is configured to control the first light generating device in dependence of the sensor signal.

Alternatively or additionally, the system may further comprise a sensor and a control system, wherein the sensor is configured to sense at least part of the system light and/or at least part of light of one or more of the available sources of light, and generate a related sensor signal, wherein the control system is configured to control one or more of the available sources of light and optional controllable optics in dependence of the sensor signal. The source of light may especially be selected from the group of the first light generating device, the (optional) second light generating device.

In embodiments, the system may comprise a light exit, like an end window or an (other) optical element, from which the system light may escape to the external of the system. The system may comprise a housing, comprising such light exit. The housing may at least partly enclose one or more light generating devices and one or more (other) optical elements.

Especially, the luminescent material is comprised by a luminescent body. The luminescent body may be a layer, like a self-supporting layer. The luminescent body may also be a coating. Especially, the luminescent body may essentially be self-supporting. In embodiments, the luminescent material may be provided as luminescent body, such as a luminescent single crystal, a luminescent glass, or a luminescent ceramic body. Such body may be indicated as “converter body” or “luminescent body”. In embodiments, the luminescent body may be a luminescent single crystal or a luminescent ceramic body. For instance, in embodiments a cerium comprising garnet luminescent material may be provided as a luminescent single crystal or as a luminescent ceramic body. In other embodiments, the luminescent body may comprise a light transmissive body, wherein the luminescent material is embedded. For instance, the luminescent body may comprise a glass body, with luminescent material embedded therein. Or the glass as such may be luminescent. In other embodiments, the luminescent body may comprise a polymeric body, with luminescent material embedded therein. The afore-mentioned may apply to the first luminescent material and/or the second luminescent material.

In embodiments, the first luminescent material, especially a luminescent body comprising the first luminescent material, may be operated in the reflective mode. The luminescent body may comprise at least one face thermally coupled to a thermally conductive body, especially a reflective thermally conductive body. Further, the reflective thermally conductive body may be reflective for the excitation light and/or the luminescent material light, especially both. The thermally conductive body may be reflective as such or may comprise a reflective coating. Especially, in embodiments the first luminescent material, especially a luminescent body comprising the first luminescent material, may be operated in the transmissive mode.

Hence, the (first and/or the second) luminescent material may be configured in the reflective mode or in the transmissive mode. In the transmissive mode, it may be relatively easy to have light source light admixed in the luminescent material light, which may be useful for generating the desirable spectral power distribution. In the reflective mode, thermal management may be easier, as a substantial part of the luminescent material may be in thermal contact with a thermally conductive element, like a heatsink or heat spreader. In the reflective mode, a part of the light source light may in embodiments be reflected by the luminescent material and/or a reflector and may be admixed in the luminescent material light. The reflector may be configured downstream of the luminescent material (in the reflective mode). In the reflective mode, a dichroic reflector may be used, to promote the luminescent material light over the device light. The former may be transmitted with a higher transmission than the latter and the latter may be reflected with a higher reflection than the former.

The term “radiant flux” may especially refer to the radiant energy emitted per unit time (by the light generating device). Instead of the term “radiant flux”, also the terms “intensity” or “radian power” may be applied. The term “radiant flux” may have as unit an energy, like especially Watts. The term “spectral power distribution” especially refers the power distribution of the light (especially in Watts) as function of the wavelength (especially in nanometers), especially in embodiments over the human visible wavelength range (380-780 nm). Especially, the term “spectral power distribution” may refer to a radiant flux per unit frequency or wavelength, often indicated in Watt/nm. Instead of the term “spectral power distribution” also the term “spectral flux” may be applied. Hence, instead of the phrase “controllable spectral power distribution”, also the phrase “controllable spectral flux” may be applied. The spectral flux may be indicated as power (Watt) per unit frequency or wavelength. Especially, herein the spectral flux is indicated as the radiant flux per unit wavelength (W/nm). Further, herein spectral fluxes and radiant fluxes are especially based on the spectral power of the device light over the 380-780 nm wavelength range.

The term “optics” may especially refer to (one or more) optical elements. Hence, the terms “optics” and “optical elements” may refer to the same items. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term “optics” may refer to a holographic element or a mixing rod. In embodiments, the optics may include one or more of beam expander optics and zoom lens optics. In embodiments, the optics may comprise an integrator, like a “Koehler integrator” (or “Kohler integrator”). Especially, the optics may be used for beam shaping and/or light mixing of the first device light, the second device light, the luminescent material light, and the optional third device light.

In embodiments, semi-transparent mirrors may be applied to combine different beams of light.

In specific embodiments, a compact package may e.g. be provided. For instance, in embodiments the system may comprise an integrated light source package, wherein the integrated light source package comprises a common support member configured to support the first light generating device, the first luminescent material, and the second luminescent material, and the optional second light generating device, wherein the common support member may comprise a thermally conductive support. The thermally conductive support may comprise one or more of a heatsink, a heat spreader, and a vapor chamber.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In embodiments, the light generating system may further comprise a temperature control system, to control one or more of the temperature of the first light generating device and/or the temperature of the first luminescent material.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or “projector” or “image projector” may be an optical device that projects an image (or moving images) onto a surface, such as e.g. a projection screen. The projection device may include one or more light generating systems such as described herein. Hence, in an aspect the invention also provides a lighting device selected from the group of a lamp, a luminaire, a projector device, a disinfection device, a photochemical reactor, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the first laser device, the third laser device, and the fourth laser device.

The terms “visible”, “visible light” or “visible emission” and similar terms refer to light having one or more wavelengths in the range of about 380-780 nm. Herein, UV may especially refer to a wavelength selected from the range of 190-380 nm, such as 200-380 nm. The terms “light” and “radiation” are herein interchangeably used, unless clear from the context that the term “light” only refers to visible light. The terms “light” and “radiation” may thus refer to UV radiation, visible light, and IR radiation. In specific embodiments, especially for lighting applications, the terms “light” and “radiation” refer to (at least) visible light.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
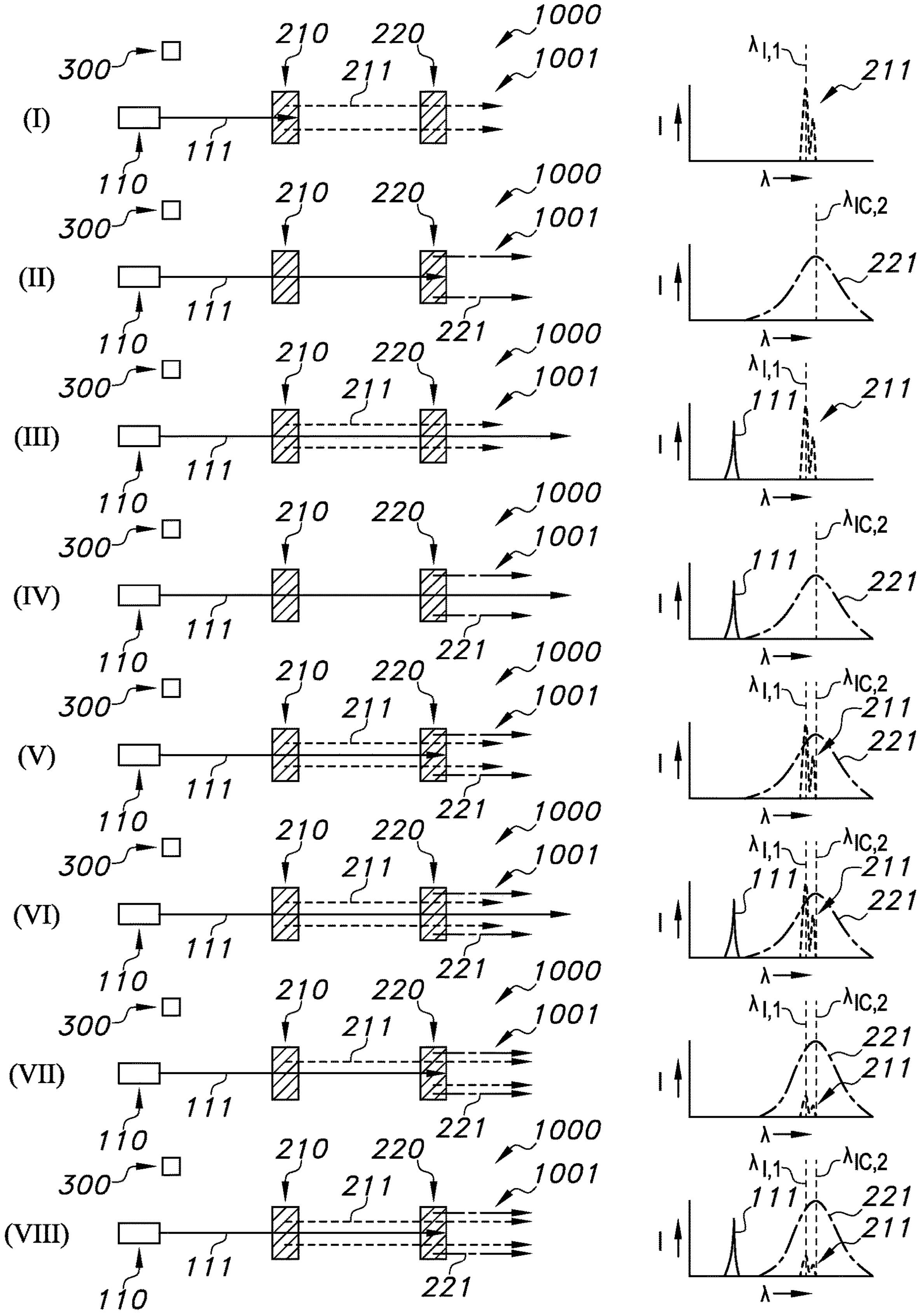
FIGS. 1A-1F schematically depict some embodiments and aspects.

Referring to FIG. 1A, amongst others the invention provides in embodiments a light generating system 1000 comprising a first light generating device 100, a first luminescent material 210, and a second luminescent material 220.

The first light generating device 110 may be configured to generate first device light 111. The first light generating device 110 may comprise a first light source 10 selected from the group of a superluminescent diode and a laser.

The first luminescent material 210 may comprise a line absorber and line emitter luminescent material providing a first luminescent material emission 211 comprising a line emission at a first wavelength $\lambda_{l,1}$ upon excitation with the first device light 111.

The second luminescent material 220 may comprise a broad band emitter luminescent material providing a second luminescent material emission 221 comprising a broad band emission upon excitation with the first device light 111. The second luminescent material emission 221 may have a second centroid wavelength $\lambda_{lc,2}$. Especially, $|\lambda_{l,1}-\lambda_{lc,2}|\leq 20$ nm may apply, more especially $|\lambda_{l,1}-\lambda_{lc,2}|\leq 10$ nm.

As the first luminescent material and the second luminescent material may be excited by the first device light, especially the first luminescent material excitation spectrum and the second luminescent material excitation spectrum may at least partially overlap.

The first light generating device 110 may be configured to pump one or more of the first luminescent material 210 and the second luminescent material 220 with the first device light 111.

Especially, the light generating system 1000 may be configured to generate system light 1001 comprising one or more of the first luminescent material emission 211 and the second luminescent material emission 221.

The second luminescent material 220 may be configured downstream of the first luminescent material 210 (relative to the first light generating device 110).

FIG. 1A schematically depict some embodiments with on the left hand a schematically configuration of the system 1000 and on the right hand a spectral power distribution of the light that may be generated by the system (i.e. system light).

Referring to FIG. 1A, embodiment I shows an embodiment wherein the first luminescent material 210 essentially absorbs all first device light 111. Hence, the system light 1001 may essentially consist of the first luminescent material emission 211.

Referring to FIG. 1A, embodiment II shows an embodiment wherein the first luminescent material 210 essentially does not absorb first device light 111, e.g. due to mismatch of the absorption wavelength and the first device light, and the second luminescent material 220 receives at least part of the first device light 111. Hence, the system light 1001 may essentially consist of the second luminescent material emission 221.

Referring to FIG. 1A, embodiment III shows an embodiment wherein the first luminescent material 210 partly absorbs all first device light 111. Hence, the system light 1001 may comprise the first luminescent material emission 211 and the first device light 111.

Referring to FIG. 1A, embodiment IV shows an embodiment wherein the first luminescent material 210 essentially does not absorb first device light 111, e.g. due to mismatch of the absorption wavelength and the first device light, and the second luminescent material 220 receives at least part of the first device light 111, and absorbs part thereof. Hence, the system light 1001 may comprise the second luminescent material emission 221 and the first device light 111.

Referring to FIG. 1A, embodiment V shows an embodiment wherein the first luminescent material 210 and the second luminescent material 222 absorbs essentially all first device light 111. Hence, the system light 1001 may comprise the first luminescent material emission 211 and the second luminescent material emission 221. As schematically depicted, the first luminescent material emission and the second luminescent material emission may have an at least partial overlapping emission spectrum.

Referring to FIG. 1A, embodiment VI shows an embodiment wherein the first luminescent material 210 and the second luminescent material 222 partly absorbs the first device light 111. Hence, the system light 1001 may comprise the first luminescent material emission 211, the second luminescent material emission 221, and the first device light.

A relative intensity of the first luminescent material emission 211 and the second luminescent material emission 221 may depend on one or more of (i) a spectral power distribution of the first device light 111, and (ii) a temperature of the first luminescent material 210. Alternatively or additionally, a relative intensity of the first luminescent material emission 211 and the second luminescent material emission 221 may depend on one or more of (i) an operation time of the first light generating device 110, and (ii) a control mode of a control system 300 configured to control the first light generating device 110 and optional controllable optics 400.

In embodiments, in a first operational mode of the system 1000, a radiant flux of the first luminescent material emission 211 may be higher than a radiant flux of the second luminescent material emission 221. In a second operational mode of the system 1000, a radiant flux of the first luminescent material emission 211 may be lower than a radiant flux of the second luminescent material emission 221.

Referring to FIG. 1A, embodiments VII and VIII, when compared to embodiments V and VI, respectively, the embodiments VII and VIII may schematically depict the second operational mode, respectively, and the embodiments may V and VI, may schematically depicts the first operational mode, respectively.

Figure 1B:
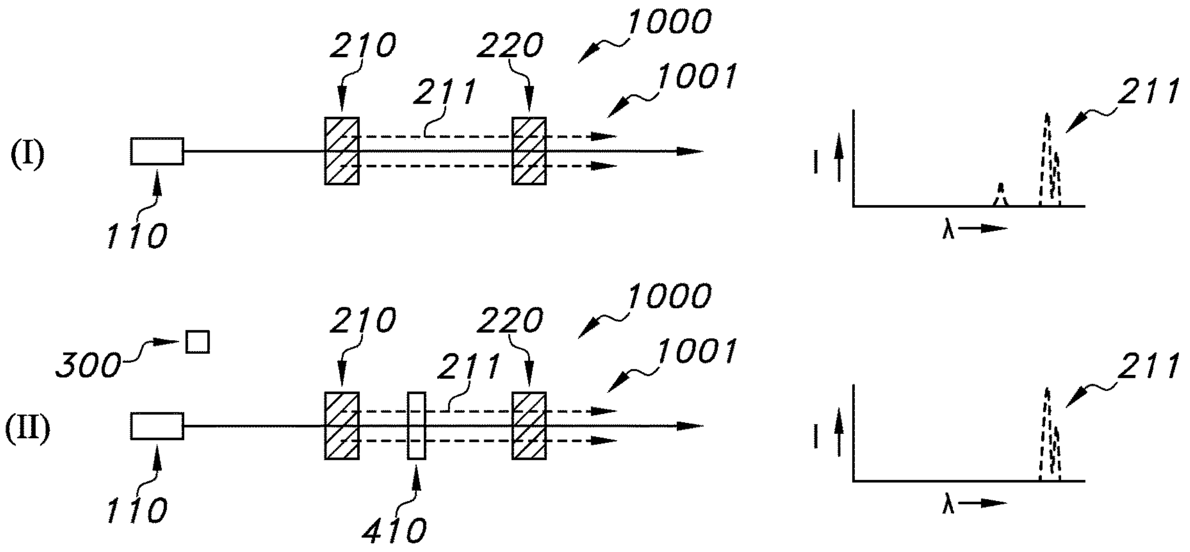

Referring to embodiments I and II of FIG. 1B, the system 1000 may further comprise a first optical element 410 configured downstream of the first luminescent material 210. The first luminescent material emission 211 downstream of the first optical element 410 may have first centroid wavelength $\lambda_{l,1}$. Especially, $|\lambda_{lc,1}-\lambda_{lc,2}|\leq 20$ nm may apply. When introducing the first optical element 410, undesired emission may at least partly be filtered out (see the comparative embodiments I and II of FIG. 1). Note that optionally an (other) optical element may be configured downstream of the second luminescent material 220; this embodiment is not schematically depicted.

Figure 1C:
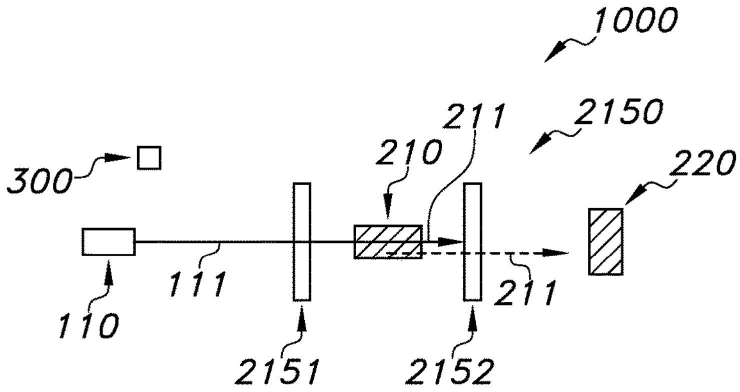

Referring to FIG. 1C, in embodiments, the light generating system 1000 may comprise a first laser arrangement 2150 comprising a first laser cavity and a first crystal comprising the first luminescent material emission 211. The first crystal may be configured within the first laser cavity. Especially, the first laser arrangement 2150 may comprise a first reflector 2151 and a second reflector 2152. The first reflector 2151 may be arranged upstream of the first crystal. The second reflector 2152 may be arranged downstream of the first crystal. The first reflector 2151 may be light transmissive for the first device light 111 and reflective for the line emission at a first wavelength $\lambda_{l,1}$. The second reflector 2152 may be reflective for the first device light 111 and partially reflective for the line emission at a first wavelength $\lambda_{l,1}$. The first laser arrangement 2150 may be configured to generate first laser light 2101 comprising the line emission at a first wavelength $\lambda_{l,1}$. The first laser light 2101 downstream of the second reflector 2152 may comprise at least part of the first luminescent material emission 211 and has a first centroid wavelength $\lambda_{lc,1}$. Especially, $|\lambda_{lc,1}-\lambda_{lc,2}|\leq 20$ nm may apply. As schematically depicted, the first laser arrangement is especially pumped by the first light generating device 110, which may especially be a laser ("pump laser").

In specific embodiments, at room temperature (i) the line emission at a first wavelength $\lambda_{l,1}$ may have a full width half maximum linewidth selected from the range of ≤20 nm, and (ii) the broad band emission may have a full width half maximum bandwidth of ≥40 nm, such as at least about 50 nm, like at least about 60 nm. In specific embodiments, the FWHM may even be at least 70 nm, or at least about 80 nm.

In embodiments, the line absorber and line emitter luminescent material may be selected from (a) ($ALnF_4:Tb^{3+}$), A may be selected from the group of Li, Na, and K; and Ln may be selected from the group of Y, La, Gd, and Lu; and (b) $M1_{0.7}Ln_{0.3}M2_{0.3}Al_{11.7}O_{19}:Pr^{3+}$, M1 may be selected from the group of Ca, Sr, and Ba; Ln may be selected from the group of Y, La, Gd, and Lu; and M2 may be selected from the group of Mg and Ca.

The broad band emitter luminescent material may comprise one or more of a divalent europium containing nitride, a divalent europium containing oxynitride, a divalent europium containing silicate, a divalent europium containing sulfide, a divalent europium containing selenide, a cerium comprising garnet, and a quantum structure. In embodiments, the broad band emitter luminescent material may comprise one or more of $MS:Eu^{2+}$, $M_2Si_5N_8:Eu^{2+}$, $malsin_3:Eu^{2+}$, and $Ca_2AlSi_3O_2N_5:Eu^{2+}$, M may comprise one or more of Ba, Sr, and Ca, especially in embodiments at least Sr.

In embodiments, the first light generating device 110 may be configured to generate blue first device light 111. In an operational mode, the system light 1001 may comprise the first device light 111, the first luminescent material emission 211, and the second luminescent material emission 221.

Figure 1D:
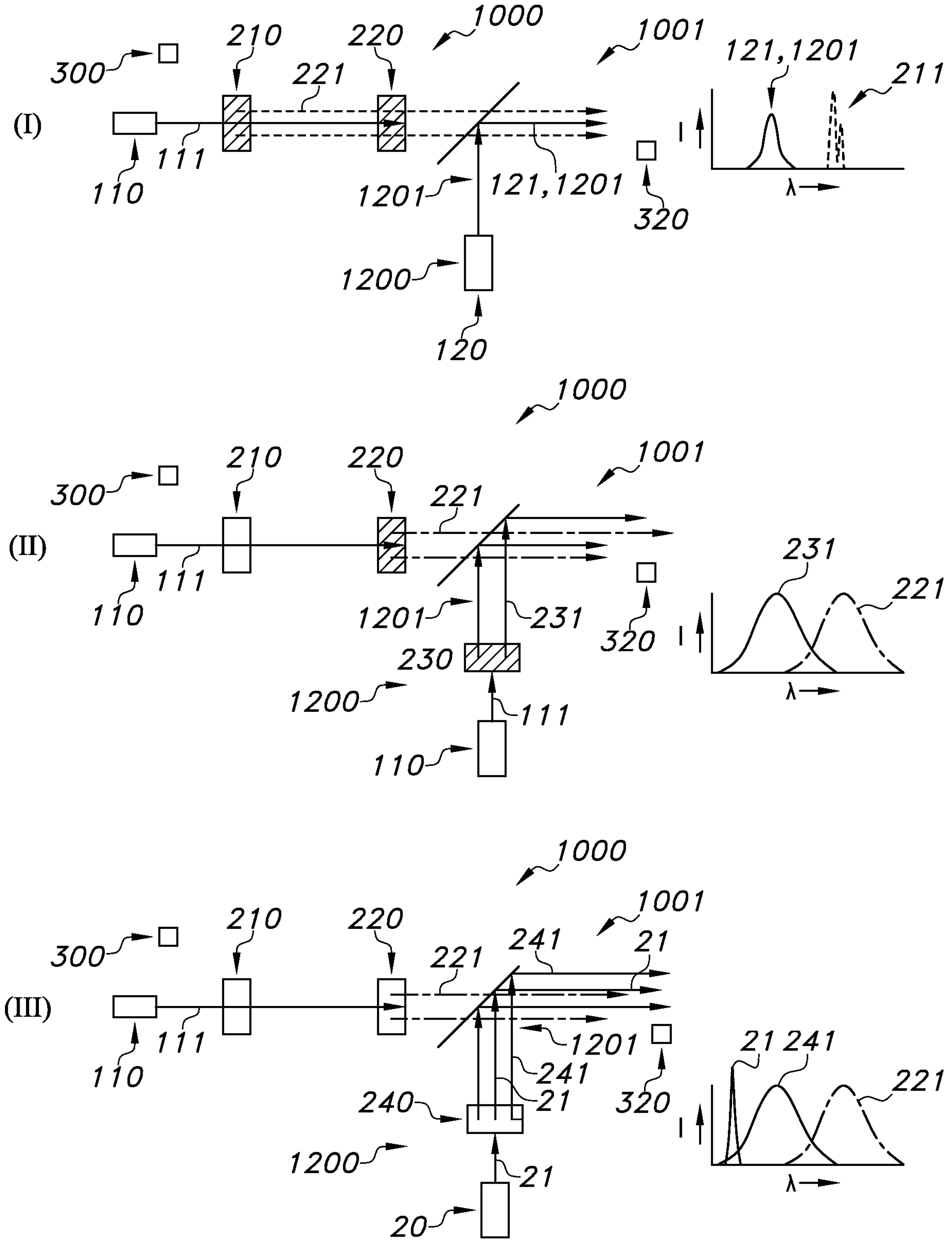

Referring to FIG. 1D, in specific embodiments, the light generating system 1000 may further comprise a second source of light 1200. The second source of light 1200 may be configured to generate second light 1201, having a spectral power distribution different from (a) the first device light 111, (b) the first luminescent material emission 211, and (c) the second luminescent material emission 221. In an operational mode, the system light 1001 may comprise (a) one or more of the first device light 111 and the second light 1201, and (b) one or more of the first luminescent material emission 211 and the second luminescent material emission 221.

Referring to embodiment I of FIG. 1D, the second source of light 1200 may comprise a second light generating device 120 comprising one or more of a superluminescent diode and a laser. The second light generating device 120 may be configured to generate second device light 121. The second light 1201 may comprise the second device light 121.

Referring to embodiment II of FIG. 1D, the second source of light 1200 may comprise a third luminescent material 230 configured to convert part of the first device light 111 into third luminescent material light 231. The second light 1201 may comprise the third luminescent material light 231.

Referring to embodiment III of FIG. 1D, the second source of light 1200 may comprise a fourth luminescent material 240 and a second light source 20 selected from the group of a superluminescent diode and a laser. The second light source 20 may be configured to generate second light source light 21. The fourth luminescent material 240 may be configured to convert at least part of the second light source light 21 into fourth luminescent material light 241. The second light 1201 may comprise the fourth luminescent material light 241.

Referring to embodiment I of FIG. 1D, only by way of example, essentially only first luminescent material emission 211 is provided, and essentially no second luminescent material emission 221. In embodiments II and III, only by way of example, essentially no first luminescent material emission 211 is provided, and essentially only second luminescent material emission 221 is provided.

One or more of the third luminescent material 230 and the fourth luminescent material 240 may comprise a luminescent material of the type $A_3B_5O_{12}$:Ce, A may comprise one or more of Y, La, Gd, Tb and Lu, and B may comprise one or more of Al, Ga, In and Sc.

In embodiments, the system light 1001 may be white light and has correlated color temperature selected from a range from 1800 K to 12000 K, and a color rendering index of at least 70.

In specific embodiments, the light generating system 1000 may further comprising a sensor 320 and a control system 300. The sensor 320 may be configured to sense an intensity of one or more of (a) the first luminescent material emission 211 downstream of the first luminescent material 210, (b) the first device light 111 downstream of the first luminescent material 210, (c) the second luminescent material emission 221 downstream of the second luminescent material 220, (d) the first device light 111 downstream of the second luminescent material 220, and generate a related sensor signal. In embodiments, the control system 300 may be configured to control the first light generating device 110 in dependence of the sensor signal.

Figure 1E:
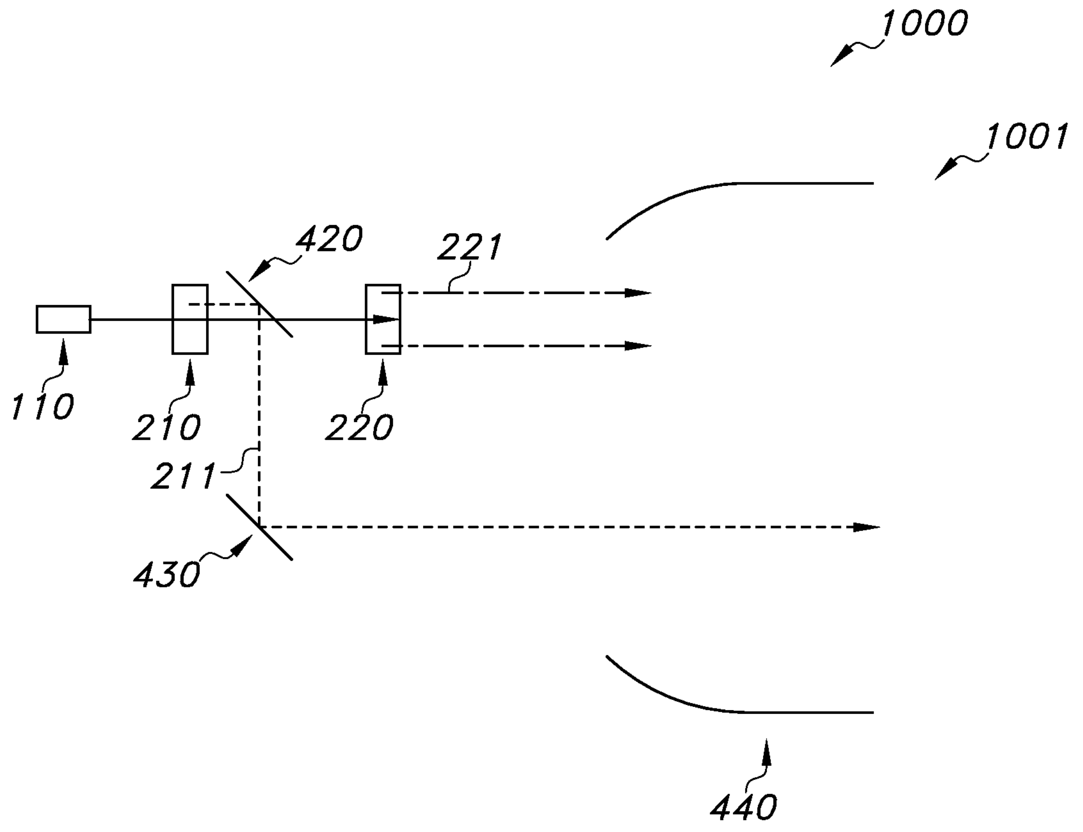

Referring to FIG. 1E, in specific embodiments, the light generating system 1000 may further comprise a second optical element 420 configured between the first luminescent material 210 and the second luminescent material 220. The second optical element 420 may be either transmissive for the first device light 111 and reflective for the first luminescent material emission 211, or reflective for the first device light 111 and transmissive for the first luminescent material emission 211. The first device light 111 the first luminescent material 210, the second luminescent material 220, and the second optical element 420 may be configured such that at least part of the first device light 111 not absorbed by the first luminescent material 210 propagates to the second luminescent material 220.

The term "optics" may especially refer to (one or more) optical elements. Hence, the terms "optics" and "optical elements" may refer to the same items. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics. See further above for examples of optics. In embodiments, the optics may comprise an integrator, like a "Koehler integrator" (or "Kohler integrator").

Reference 430 may refer to an optical element, especially a mirror, and reference 440 may refer to an optical element, especially having the functionality of beam shaping and/or light mixing.

The system 1000 may further comprise a control system 300 configured to control a spectral power distribution of the system light.

Figure 1F:
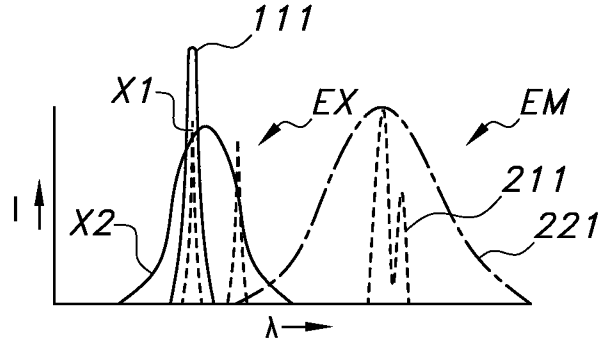

FIG. 1F schematically depicts that the excitation spectra, indicated with EX may at least partly overlap. Reference x1 refers to the excitation spectrum of the first luminescent material, which may also comprise relatively narrow excitation lines. Reference x2 refers to the excitation spectrum of the second luminescent material, which may also comprise a relatively broad band. Here, the emission spectra are indicated dashed.

Reference EM refers to emission; the first luminescent material emission 211 and the second luminescent material emission 221 are schematically depicted. Their color points may be substantially the same.

In FIG. 1F also an embodiment of the first device light 111 is schematically depicted. As shown, this device light 111 may have a relatively narrow band width. The first device light 111 may comprise spectral band (or device light emission band) having a full width half maximum selected from the range of <40 nm, such as ≤35 nm, like in embodiments ≤30 nm, more especially selected from the range of ≤25 nm, such as ≤20 nm, like even smaller, such as ≤15 nm, or ≤10 nm. As indicated above, the first light generating device 110 may comprise a laser. More especially, the first light generating device 110 is a laser. Hence, the first light generating device 110, optionally in combination with an optical element, may be configured to generate laser light (i.e. the first device light may be laser light), having a relative narrow bandwidth (or line width). As shown, a slight mismatch of the excitation band, i.e. the spectral band (especially a spectral line) of the first light generating device and the absorption band, more especially absorption line, of the first luminescent material, may lead to a substantial reduction in the intensity of the generate first luminescent material light. Referring to FIG. 1F, when the first device light 111 and the excitation X1 overlap well, at least a part of the first device light is converted into first luminescent material light. However, would there be mismatch, e.g. due to a temperature change of the device or the first luminescent material, or drift, then the second luminescent material may catch up. In this way, the impact on the spectral power distribution of the system light may be reduced or even prevented.

Figure 2:
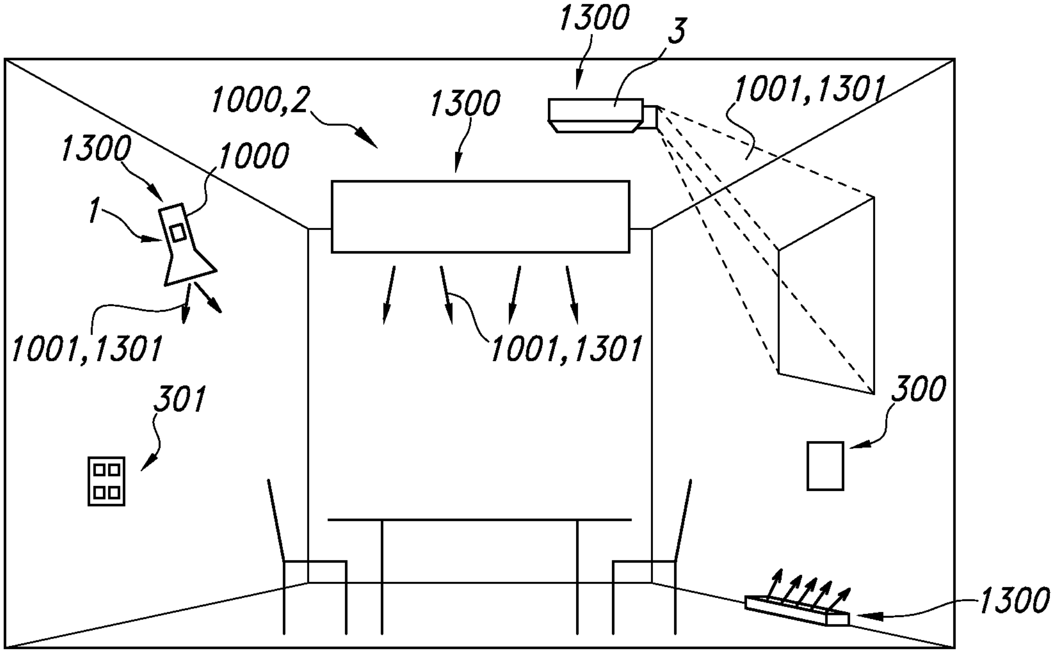
FIG. 2 schematically depict some applications.

FIG. 2 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 2 also schematically depicts an embodiment of lamp 1 comprising the light generating system 1000. Reference 3 indicates a projector device or projector system, which may be used to project images, such as at a wall, which may also comprise the light generating system 1000. Hence, FIG. 2 schematically depicts embodiments of a lighting device 1300 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1300 is indicated with reference 1301. Lighting device light 1301 may essentially consist of system light 1001, and may in specific embodiments thus be system light 1001.

Amongst others, a high brightness lighting device comprising a laser, a line absorption-line emission laser crystal providing crystal light, and a phosphor providing phosphor light having essentially the same dominant wavelength as the crystal light, is herein proposed. Thus the laser provides laser light, the line absorption-line emission laser crystal may at least partly converts laser light into crystal light, and the phosphor may at least partly convert laser light into phosphor light. In embodiments, during a lighting mode of the lighting device, the line absorption-line emission laser crystal may fully convert laser light into crystal light. But during the lifetime and/or at different currents, the emission wavelength of the laser may show a change in peak wavelength and may not (fully) be converted by the laser line absorption-line emission laser crystal. Laser light which is not converted by the line absorption-line emission laser crystal may be converted by the phosphor into phosphor light having essentially the same dominant wavelength as the crystal light.

For example, the laser may provide blue laser light of about 488 nm. This laser light may be used to pump a $Pr^{3+}$:$Sr_{0.7}La_{0.3}Mg_{0.3}Al_{11.7}O_{19}$ (Pr:ASL) red crystal providing 620 nm light. Downstream the red crystal a red phosphor may be arranged. The red phosphor may be a broad band phosphor, or a narrow band phosphor. Suggested lighting device can be combined with other solid state light sources or further lighting devices providing different colors e.g. to provide white light preferably with a high CRI and R9 value.

At very high intensities, it may be that the red phosphor cannot be pumped to the same level as the line emitter. This means that then there may be a need for a detector so that intensity of the other colors may be re-adjusted so that the light source operates at lower intensity adjusted for the contribution from the phosphor in the white light source.

Figure 3A:
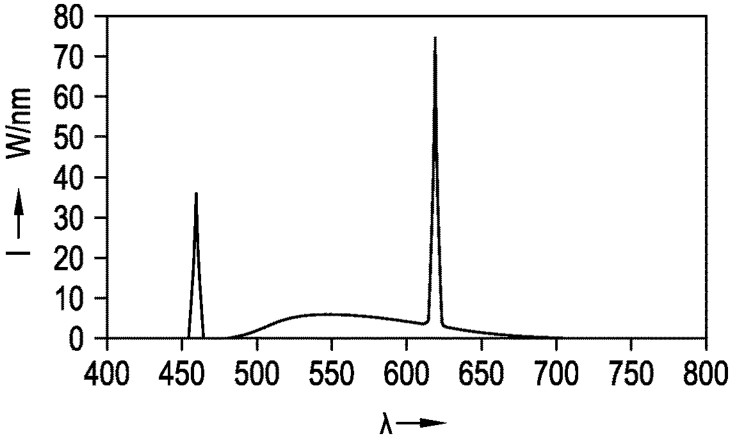
FIG. 3A-3C show some simulation.
Figure 3B:
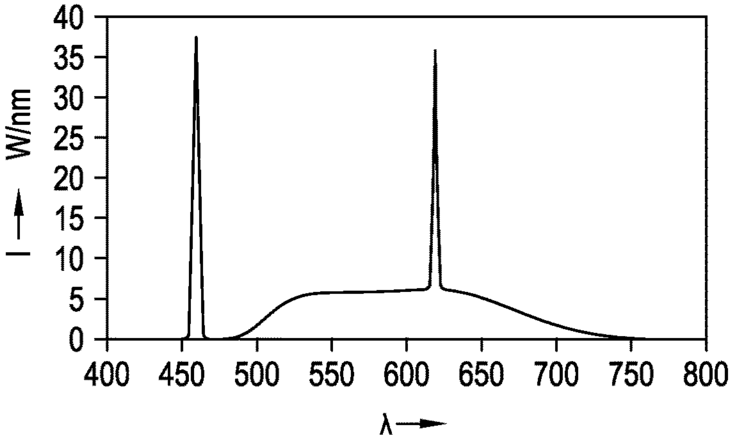
Figure 3C:
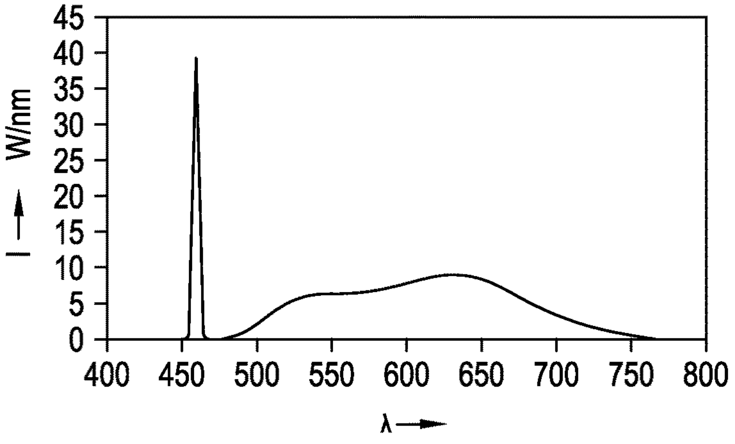

Several simulations have been performed, of which some examples are shown below. FIG. 3A shows the emission spectrum where full conversion of blue is obtained from Pr:ASL crystal, in combination with cerium doped YAG and blue emission. FIG. 3B shows spectrum when blue light is partially converted by Pr:ASL and the rest is converted by a red phosphor. FIG. 3C shows the spectrum when blue light is only converted by red phosphor.

In the table below characteristics of the spectra is tabulated:

| Pr:ASL 620 nm (fraction) | YAG (fraction) | Red phosphor (fraction) | 460 nm (fraction) | CCT (K) | CRI | R9 | Luminous efficacy (lum/W) |
|---|---|---|---|---|---|---|---|
| 23 | 66 | 0 | 11 | 3000 | 93 | 64 | 354 |
| 8 | 55 | 28 | 10 | 3000 | 93 | 70 | 307 |
| 0 | 48 | 43 | 9 | 3000 | 90 | 69 | 282 |

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

Hence, amongst others the invention provides in embodiments a (high brightness) lighting device comprising a laser, a line absorption-line emission laser crystal providing crystal light, and a phosphor providing phosphor light having essentially the same dominant wavelength and/or centroid wavelength as the crystal light.

The invention claimed is:

1. A light generating system comprising a first light generating device, a first luminescent material, and a second luminescent material, wherein:

the first light generating device is configured to generate first device light, wherein the first light generating device comprises a first light source selected from the group of a superluminescent diode and a laser;

the first luminescent material comprises a line absorber and line emitter luminescent material providing a first luminescent material emission comprising a line emission at a first wavelength $\lambda_{L,1}$ upon excitation with the first device light;

the second luminescent material comprises a broad band emitter luminescent material providing a second luminescent material emission comprising a broad band emission upon excitation with the first device light, wherein the second luminescent material emission has a second centroid wavelength $\lambda_{LC,2}$, wherein $|\lambda_{L,1}-\lambda_{LC,2}| \leq 20$ nm;

the first light generating device is configured to pump one or more of the first luminescent material and the second luminescent material with the first device light; and the light generating system is configured to generate system light comprising one or more of the first luminescent material emission and the second luminescent material emission.

2. The light generating system according to claim 1, wherein the second luminescent material is configured downstream of the first luminescent material; wherein at room temperature (i) the line emission at a first wavelength $\lambda_{L,1}$ has a full width half maximum linewidth selected from the range of ≤20 nm, and (ii) the broad band emission has a full width half maximum bandwidth of ≥40 nm; and wherein the first light source comprises a laser.

3. The light generating system according to claim 1, wherein a relative intensity of the first luminescent material emission and the second luminescent material emission depends on one or more of (i) a spectral power distribution of the first device light, and (ii) a temperature of the first luminescent material.

4. The light generating system according to claim 1, wherein a relative intensity of the first luminescent material emission and the second luminescent material emission depends on one or more of (i) an operation time of the first light generating device, and (ii) a control mode of a control system configured to control the first light generating device and optional controllable optics; and wherein in a first operational mode of the system, a radiant flux of the first luminescent material emission is higher than a radiant flux of the second luminescent material emission, and wherein in a second operational mode of the system a radiant flux of the first luminescent material emission is lower than a radiant flux of the second luminescent material emission.

5. The light generating system according to claim 1, comprising a first laser arrangement comprising a first laser cavity and a first crystal comprising the first luminescent material emission, wherein the first crystal is configured within the first laser cavity; wherein the first laser arrangement comprises a first reflector and a second reflector, wherein the first reflector is arranged upstream of the first crystal and wherein the second reflector is arranged downstream of the first crystal, wherein the first reflector is light transmissive for the first device light and reflective for the line emission at a first wavelength $\lambda_{L,1}$, wherein the second reflector is reflective for the first device light and partially reflective for the line emission at a first wavelength $\lambda_{L,1}$; wherein the first laser arrangement is configured to generate first laser light comprising the line emission at a first wavelength $\lambda_{L,1}$, wherein the first laser light downstream of the second reflector comprises at least part of the first luminescent material emission and has a first centroid wavelength $\lambda_{LC,1}$, wherein $|\lambda_{LC,1}-\lambda_{LC,2}|$ \$20 nm.

6. The light generating system according to claim 1, wherein the line absorber and line emitter luminescent material is selected from (a) $ALnF_4$: $Tb^{3+}$, wherein A is selected from the group of Li, Na, and K, and wherein Ln is selected from the group of Y, La, Gd, and Lu, and (b) $M1_{0.7}Ln_{0.3}M2_{0.3}Al_{11.7}O_{19}$: $Pr^{3+}$, wherein M1 is selected from the group of Ca, Sr, and Ba, wherein Ln is selected from the group of Y, La, Gd, and Lu, and wherein M2 is selected from the group of Mg and Ca.

7. The light generating system according to claim 1, wherein the broad band emitter luminescent material comprises one or more of MS: $Eu^{2+}$, $M_2Si_5N_8$: $Eu^{2+}$, $MAlSiN_3$: $Eu^{2+}$, and $Ca_2AlSi_3O_2N_5$: $Eu^{2+}$, wherein M comprises one or more of Ba, Sr, and Ca, especially in embodiments at least Sr.

8. The light generating system according to claim 1, wherein the first light generating device is configured to generate blue first device light; wherein the system light comprises the first device light, the first luminescent material emission, and the second luminescent material emission.

9. The light generating system according to claim 1, further comprising a second source of light, wherein the second source of light is configured to generate second light, having a spectral power distribution different from (a) the first device light, (b) the first luminescent material emission, and (c) the second luminescent material emission; wherein the system light comprises (a) one or more of the first device light and the second light, and (b) one or more of the first luminescent material emission and the second luminescent material emission.

10. The light generating system according to claim 9, wherein the second source of light comprises one or more of: (A) a second light generating device comprising one or more of a superluminescent diode and a laser, wherein the second light generating device is configured to generate second device light, wherein the second light comprises the second device light; (B) a third luminescent material configured to convert part of the first device light into third luminescent material light, wherein the second light comprises the third luminescent material light; and (C) a fourth luminescent material and a second light source selected from the group of a superluminescent diode and a laser; wherein the second light source is configured to generate second light source light; wherein the fourth luminescent material is configured to convert at least part of the second light source light into fourth luminescent material light; wherein the second light comprises the fourth luminescent material light.

11. The light generating system according to claim 1, wherein one or more of the third luminescent material and the fourth luminescent material comprises a luminescent material of the type $A_3B_5O_{12}$: Ce, wherein A comprises one or more of Y, La, Gd, Tb and Lu, and wherein B comprises one or more of Al, Ga, In and Sc.

12. The light generating system according to claim 1, wherein the system light is white light and has correlated color temperature selected from a range from 1800 K to 12000 K, and a color rendering index of at least 70.

13. The light generating system according to claim 1, wherein the light generating system further comprises a second optical element configured between the first luminescent material and the second luminescent material, wherein the second optical element is either transmissive for the first device light and reflective for the first luminescent material emission, or reflective for the first device light and transmissive for the first luminescent material emission; and wherein the first device light the first luminescent material, the second luminescent material, and the second optical element are configured such that at least part of the first device light not absorbed by the first luminescent material propagates to the second luminescent material.

14. The light generating system according to claim 1, further comprising a sensor and a control system, wherein the sensor is configured to sense an intensity of one or more of (a) the first luminescent material emission downstream of the first luminescent material, (b) the first device light downstream of the first luminescent material, (c) the second luminescent material emission downstream of the second luminescent material, (d) the first device light downstream of the second luminescent material, and generate a related sensor signal, wherein the control system is configured to control the first light generating device in dependence of the sensor signal.

15. A lighting device selected from the group of a lamp, a luminaire, a projector device, and an optical wireless communication device, comprising the light generating system according to claim 1.

* * * * *